3,019,236
20-AMINO-12,18-CYCLOPREGNANE DERIVATIVES
Vlasios Georgian, Belmont, Mass., and James F. Kerwin, Broomall, Pa., assignors to Smith Kline & French Laboratories, Philadelphia, Pa., a corporation of Pennsylvania
No Drawing. Filed July 31, 1951, Ser. No. 127,825
12 Claims. (Cl. 260—397.3)

This invention relates to novel 20-amino-12,18-cyclopregnane derivatives having utility as steroid intermediates and as novel hormonal agents. More specifically, these compounds have been found to possess androgenic-anabolic activity. This invention also relates to novel intermediates and processes for preparing such 20-amino-12,18-cyclopregnane derivatives.

The compounds of this invention are unusual in that they have a condensed cyclopropyl ring moiety at the 12,13-positions of the parent steroid nucleus together with an amine function at position 20.

More specifically, the compounds representative of this invention can be illustrated by the following structural formula:

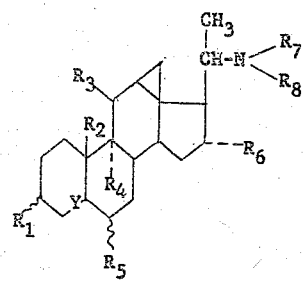

FORMULA I in which:

$\xi$ represents $\alpha$ or $\beta$, | represents $\beta$ and ¦ represents $\alpha$.
$R_1$ represents hydroxy or, when taken together with the ring methylene group to which it is attached, keto.
$R_2$ represents hydrogen or methyl; when a $\Delta^1$ vinylene moiety is present, of course, $R_2$ is necessarily methyl.
$R_3$ represents hydrogen, $\beta$-hydroxy or, when taken together with the ring methylene group to which it is attached, keto.
$R_4$ represents hydrogen or fluoro.
$R_5$ represents hydrogen, methyl or fluoro.
$R_6$ represents hydrogen or methyl.
$R_7$ and $R_8$ are hydrogen or lower alkyl of from 1–4 carbons inclusive, at least one of which is alkyl.

Preferably only one of $R_4$, $R_5$ and $R_6$ is a substituent other than hydrogen.

Advantageous compounds are those of Formula I in which $R_3$ is keto, $R_4$, $R_5$ and $R_6$ are hydrogen, $R_7$ is hydrogen and $R_8$ is methyl.

The compounds represented by Formula I may be used in the form of their acid addition salts. When used as therapeutic agents such salts must be pharmaceutically acceptable, such as the hydrochloride, sulfate, phosphate, etc. When used as intermediates, any acid addition or quaternary ammonium salt may be substituted. These addition compounds are prepared by reacting the base with an acid or reactive alkyl halide in a suitable organic solvent, such as ether or benzene. Such addition compounds are considered part of this invention and fully equivalent to the bases of Formula I. Also, O or N-acyl derivatives with a maximum of 8 carbon atoms can be prepared if desired by standard acylation procedures well-known to the art, such as reaction with an acid chloride or anhydride. Such derivatives are also equivalent to the parent compounds.

It will be recognized by one skilled in the art that catalytic reduction conditions, such as those under which the 20-amino function or the 11-hydroxy function are produced, give rise to mixtures of the $\alpha$ or $\beta$ isomers which can be separated by fractional crystallization if desired. Practically speaking, the 20$\alpha$-amino-11$\beta$-hydroxy congeners are the most important members of the series and are preferred. Where there is no designation of configuration in the examples, a mixture of $\alpha$ and $\beta$ isomers is present. The condensed cyclopropyl ring is $\beta,\beta$ in relation to the steroid nucleus and is so represented in the disclosure of this invention.

It was unexpectedly found that when 11-keto-18-halo steroids having the structure:

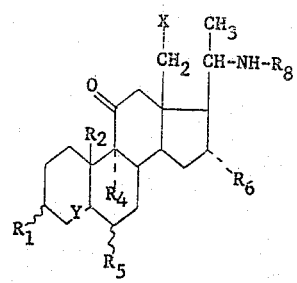

FORMULA II in which $R_1$, $R_2$, $R_4$, $R_5$, $R_6$, $R_8$ and Y are as in Formula I and X is chloro or bromo, are heated under certain conditions to form conanines as described in our copending application, Serial No. 843,334 filed September 30, 1959 and our U.S. Patent No. 2,983,736, a by-product was also obtained, which proved to be the 12,18-cyclopregnanes of Formula I.

The reaction conditions of the intramolecular condensation have been found to consist of reaction of the 18-halosteroids under strongly basic conditions in solvents in which th basic reagent and the steroid starting material are substantially soluble. For instance, we have found that carbonates, such as potassium carbonate, are not sufficiently basic to yield appreciable amounts of the cyclic product but give predominantly the conanine. The most advantageous method of carrying out the reaction is to react the 18-halo starting material in alcoholic alkali metal hydroxide, ethoxide or methoxide solution at from room temperature up to the reflux temperature of the reaction solution. Preferred alkali metals are sodium or potassium. The alcoholic solution can be chosen from those usually used in organic chemistry, particularly ethanol, methanol or isopropanol. The reaction time has been found not to be critical and can vary from overnight at room temperature to a few minutes in refluxing ethanol. Reaction conditions other than those discussed above have been found to be of little additional advantage.

The starting material compounds for the reaction can possess any of the amine functions as disclosed herebefore. Additionally, an O-acyl or N-acyl derivative, such as O or N-trifluoroacetyl compounds, can be used if desired since the acyl moiety will be removed during the basic condensation reaction. Also if desired for convenience, an acid addition salt of the 20-aminosteroid may be used, such as the trifluoroacetate salt.

The preparation of the 18-chlorosteroid starting material is disclosed in more detail in United States Patents, No. 2,959,586, No. 2,975,174, No. 2,960,503 and especially No. 2,983,736 as well as in applications, Serial No. 1,450 filed January 11, 1960, Serial No. 843,334 filed September 30, 1959 and Serial No. 88,034 filed February 9, 1961. Briefly, the 19-chloro compounds are prepared from the known 20-keto compounds which are fully described in the prior art by the following steps: reductive alkylation with a primary lower alkylamine to form the 21-alkylamine derivative, N-chlorination in chloroform or methylene chloride solution with 5% sodium hypochlorite solution to form the N-chloro derivatives, then ultraviolet irradiation in trifluoroacetic acid solution to form the desired 18-chlorosteroid. While many of the preliminary reactions for preparing necessary starting materials are described in detail in the previous patents or applications referred to, several model synthetic examples are presented hereafter for complete clarity for those skilled in the art.

The 11-keto group of the starting materials represented by Formula II is essential to the course of the condensation reaction. The congeners which are part of this invention in which $R_3$ is hydrogen or hydroxy are prepared by reduction of the 11-keto function by standard reactions. The 12,18-cyclo moiety has been found to be very stable under many chemical reactions standard in the steroid art, therefore, a wealth of obvious substituents in the steroid nucleus can be made by those skilled in the art other than those shown as illustrative in the following examples.

*Example 1*

Fifteen grams of 3α-hydroxypregnan-11,20-dione is dissolved in 200 ml. of ethanol containing 15–20 g. of methylamine, and the clear solution is allowed to stand for five hours. It is then shaken with 1.0 g. of platinum oxide catalyst and hydrogen at an initial pressure of 50 p.s.i. Hydrogenation commences after an induction period of one-half to one hour. When one mole of hydrogen is absorbed, the hydrogenation stops. The catalyst is filtered off and the alcohol is removed on the steam bath, the last traces off in vacuo. The residue is taken up in dilute hydrochloric acid and extracted three times with ether to remove nonbasic material. The amine, regenerated by the addition of alkali, is extracted with ether. The ether solution of the amine is washed twice with saturated salt solution, dried over sodium sulfate and then concentrated to ca. 50–60 ml. Upon cooling, crystals develop which are filtered and washed with cold ether to yield 3α-hydroxy-20-methylaminopregnan-11-one, M.P. 136–143° C.

A solution of 6.0 g. of 3α-hydroxy-20-methylaminopregnan-11-one in 300 ml. of chloroform is stirred with 300 ml. of 5% sodium hypochlorite solution for one hour. The hypochlorite is removed and the treatment repeated. The chloroform layer is separated, washed with water, dried and evaporated to give 3α-hydroxy-20-(N-methyl-N-chloroamino)-pregnan-11-one identical to that in U.S. Patent No. 2,983,736. The 20α and 20β isomers are optionally separated by fractional recrystallization from ethanol.

The above N-chloroamine mixture (6.6 g.) is dissolved in 65 ml. of redistilled trifluoroacetic acid and irradiated with ultraviolet light under nitrogen for 40 minutes. The trifluoroacetic acid is evaporated in vacuo to give 3α-hydroxy-18-chloro-20-methylaminopregnan-11-one as the ester salt. This compound (2.5 g.) in ethanol is added to 5 g. of sodium ethoxide in 50 ml. of ethanol. The mixture is heated at reflux for 10 minutes and quenched in water to give 3α-hydroxy-20α and 20-β-methylamino-12,18-cyclopregnan-11-one.

*Example 2*

A solution of 15 g. of 3β-hydroxy-20-(N-chloro-N-α-methylamino)-allopregnan-11-one (prepared as in the U.S. Patent No. 2,983,736) in 150 ml. of chilled trifluoroacetic acid is irradiated as described using three 15-watt G.E. germicidal lamps for 15 minutes. The irradiated solution is then treated with 7.4 g. of trifluoroacetic anhydride solution (90% of theoretical) and permitted to stand at room temperature for one hour. The solution is evaporated under reduced pressure to leave an oily residue which is dissolved in a minimum amount of acetone, treated with petroleum ether, then ether. Such trituration induces crystallization of the desired 18-chloro ester salt, M.P. 164–169° C.

A solution of 5 g. of 3β-hydroxy-18-chloro-20α-methylaminoallopregnan-11-one as the O-trifluoroacetoxy trifluoroacetic acid salt in 25 ml. of methanol is added dropwise with stirring to a hot solution of 10 g. of potassium hydroxide in 50 ml. of methanol. The mixture is heated at reflux for 5 minutes and quenched in 10 volumes of water to give 3β-hydroxy-20α-methylamino-12,18-cycloallopregnan-11-one, M.P. 228–231° C., after recrystallization from methanol.

The methanol filtrate and the aqueous filtrate are combined and extracted with methylene chloride. Evaporation of the dried extracts gives a residue which is heated with an excess of acetic anhydride for two hours. Quenching in water and filtration followed by neutralization of the filtrate and extraction into methylene chloride give 3β-acetoxy-conanine-11-one, M.P. 185–190° C.

The cyclo compound (500 mg.) is heated on the steam bath with an excess of acetic anhydride. Quenching and extraction gives the O,N-diacetyl derivative.

*Example 3*

A mixture of 25 g. of 3β-trifluoracetoxy-18-chloro-20α-methylaminoallopregnan-11-one trifluoracetate (Example 2), 8 ml. of trifluoracetic anhydride and 625 ml. of dry benzene is heated at reflux for one hour. The cooled solution is concentrated to an oil which crystallized from methanol to give the amide, M.P. 175–177° C. This compound is dissolved in 300 ml. of ethanol with 30 ml. of 40% sodium hydroxide solution. After a reflux period of three hours, cooling separated a product identical with that of Example 2.

*Example 4*

A mixture of 1 g. of 18-chloro-3α-hydroxy-16α-methyl-20-methylaminopregnan-11-one (U.S. Patent No. 2,960,503) in a solution of 2 g. of potassium hydroxide and 20 ml. of methanol is heated for 30 minutes and quenched. Working up as in Example 2 gives 3α-hydroxy-16α-methyl-20-methylamino-12,18-cyclopregnan-11-one.

*Example 5*

To 7.2 g. of 5α-hydroxy-6β-methyl-3,11,20-allopregnantrione in 100 ml. of methanol is added 0.4 g. of sodium borohydride dissolved in pyridine. After 10 minutes an excess of dilute hydrochloric acid is added and the mixture extracted with methylene chloride. Evaporation of the solvent and chromatography of the residue over alumina yields 3β,5α-dihydroxy-6β-methyl-11,20-allopregnandione.

The dione prepared as above (18.0 g.) and 0.5 g. of platinum oxide are added to 200 ml. of ethanol containing 10% w./w. of methylamine and the mixture hydrogenated until one mole of hydrogen is absorbed. The catalyst is removed by filtration and the filtrate evaporated to dryness. Treatment of the residue with chloroform-acetic acid then neutralizing the acid extract gives 3β,5α - dihydroxy - 6β - methyl - 20α - methylaminoallopragnan-11-one.

A solution of 7.6 g. of the amine in 500 ml. of anhydrous toluene and 100 ml. of cyclohexanone is heated at reflux and a solution of 25.0 g. of aluminum isopropoxide in 100 ml. of toluene is added dropwise with stirring. Refluxing is continued for two hours, 10 ml. of glacial acetic acid is added and the mixture steam distilled. The residue is made basic, taken into chloroform. The organic extracts are shaken with dilute acid. The acid extracts are made neutral to give 3,11-diketo-6α-methyl-20-methylamino-4-pregnene.

A solution of 6.0 g. of 3,11-diketo-6α-methyl-20-methylamino-4-pregnene in 300 ml. of chloroform is stirred with 300 ml. of 5% sodium hypochlorite solution for one hour. The hypochlorite is removed and the treatment repeated. The chloroform layer is separated, washed with water, dried and evaporated to give 3,11-diketo - 6α - methyl - 20 - (N - methyl - N - chloroamino)-4-pregnene.

The above N-chloramine (6.6 g.) is dissolved in 65 ml. of redistilled trifluoroacetic acid and irradiated with ultraviolet light under nitrogen for 40 minutes. The trifluoroacetic acid is evaporated in vacuo to give crude 18 - chloro - 3,11 - diketo - 6α - methyl - 20 - methylamino-4-pregnene.

This 18-chloro compound (2.5 g.) is heated in 3 g. of potassium methoxide in methanol for two hours. Quenching and working up as in Example 2 gives 3,11-diketo - 6α - methyl - 20 - methylamino - 12,18 - cyclo - 4-pregnene.

Example 6

A mixture of 750 mg. of 18-chloro-6β,9α-difluoro-3β-hydroxy-20-methylaminoallopregnan-11-one (U.S. Patent No. 2,959,586), 2 g. of potassium hydroxide and 15 ml. of methanol is heated at reflux for one hour, then quenched as in Example 1 to give 6β,9α-difluoro-3β-hydroxy-20-methylamino-12,18-cyclo-allopregnan-11-one.

Example 7

A mixture of 850 mg. of 18-chloro-6α-fluoro-3β-hydroxy-20-methylamino-19-norallopregnan-11-one (U.S. Patent No. 2,959,586), 2.5 g. of sodium hydroxide and 20 ml. of ethanol is heated at reflux then worked up as in Example 2 to give 6α-fluoro-3β-hydroxy-20-methylamino-19-nor-12,18-cycloallopregnan-11-one.

Example 8

A mixture of 1 g. of 18-chloro-9α-fluoro-3β-acetoxy-20α-methylamino-allopregnan-11-one (U.S. Patent No. 2,959,586), 3 g. of potassium hydroxide in 40 ml. of methanol is reacted and quenched as in Example 2 to give 9α-fluoro-3β-hydroxy-20α-methylamino-12,18-cyclo-allopregnan-11-one.

Example 9

A mixture of 750 g. of 18-chloro-20-butylamino-3β-hydroxy-19-norallopregnan-11-one (prepared as described in U.S. Patent No. 2,960,503 using 11-keto-11-nor-progesterone), 2 g. of sodium hydroxide and 25 ml. of methanol is reacted and worked up as in Example 2 to give the desired 20-butylamino-3β-hydroxy-19-nor-12,18-cycloallopregnan-11-one.

Example 10

To a solution of methylamine in 100 ml. of ethanol (10% w./w.) is added 9.3 g. of 3β-acetoxy-5-pregnen-11,20-dione and 0.25 g. of platinum oxide. The mixture is then hydrogenated until one mole of hydrogen is absorbed. The catalyst is filtered off and the solvent evaporated. The residue is taken up in dilute hydrochloric acid, the acid solution made basic and then extracted with chloroform. By removing the chloroform in vacuo and recrystallization of the residue, 3β-acetoxy-20α-methylamino-5-pregnen-11-one is obtained which is hydrolyzed by refluxing in methanolic potassium hydroxide to the 3-hydroxy derivative.

A solution of 5.0 g. of 3β-hydroxy-20α-methylamino-5-pregnen-11-one in 250 ml. of toluene and 100 ml. of cyclohexanone is oxidized with 15.0 g. of aluminum isopropoxide by heating at reflux for two hours. Glacial acetic acid (10 ml. in 25 ml. of toluene) is added and the mixture steam distilled for one hour, then cooled. the mixture is made basic with 40% sodium hydroxide solution, cooled and extracted with chloroform. The extract is washed with water, then extracted with 5% acetic acid. The aqueous extracts are made basic, the solid filtered and recrystallized from acetone to give 3,11-diketo-20α-methylamino-4-pregnene.

A solution of 2.5 g. of the amine in 75 ml. of methylene chloride is reacted with sodium hypochlorite as described to give the N-chloro which is rearranged to give the 18-chloro by irradiation in trifluoroacetic acid.

The 18-chlor compound (1 g.) is condensed with an excess of ethanolic sodium hydroxide as described above to give 3,11 - diketo - 20α-methylamino - 12,18 - cyclo-4-pregnene, M.P. 128–130° C.

Example 11

A solution of 1 g. of 3β-hydroxy-20α-methylamino-12,18-cycloallopregnan-11 one (Example 2) in tetrahydrofuran is added dropwise to a refluxing solution of 0.5 g. of lithium aluminum hydride in 25 ml. of tetrahydrofuran. After refluxing for 1.5 hours, the reaction mixture is quenched in water and filtered. The filtrate is evaporated and the residue recrystallized from aqueous methanol to give 3β,11β-dihydroxy-20α-methylamino-12,18-cycloallopregnane, M.P. 220–240° C.

Example 12

Sodium (0.37 g.) is dissolved in 15 ml. of diethylene glycol with heating. About 2 ml. of anhydrous hydrazine is distilled into the flask and 1.55 g. of 3β-hydroxy-20α-methylamino-12,18-cycloallopregnan-11-one (Example 2) is added. After heating at 180° C. overnight, the mixture is distilled until the temperature of the reaction mixture is 210° C. and held there for 22 hours. The mixture is cooled and diluted with water to separate 3β-hydroxy-20α-methylamino-12,18-cycloallopregnane, M.P. 192–194.5° C.

Example 13

A mixture of 5 g. of 3β-hydroxy-20α-methylamino-12,18-cycloallopregnan-11-one (Example 2), 10 ml. of 85% formic acid and 5 ml. of 40% formaldehyde solution is heated at reflux for four hours, diluted with water, made basic and filtered. The solid is dissolved in hot ethanol. The alcoholic solution is made basic with 10% sodium hydroxide, then diluted with water and cooled. Recrystallization of the resulting solid from ethanol gives 3β - hydroxy-20α-dimethylamino-12,18-cycloallopregnan-11-one, M.P. 181–184° C. Acetylation with an excess of acetic anhydride on the steam bath, then quenching gives the acetate derivative.

Using this procedure on 20-butylamino-3β-hydroxy-19-nor-12,18-cycloallopregnan-11-one (1 g.), gives the 20-methylbutylamino compound.

Example 14

A mixture of 4 g. of the 20α-dimethylamino compound of Example 13, 10 ml. of methyl iodide and 100 ml. of benzene is heated at reflux for five hours. The cooled mixture is diluted with ether to separate the methiodide quaternary salt, M.P. >240° C.

The 20-methylbutyl compound is similarly reacted with ethyl chloride to form the ethochloride quaternary salt.

Example 15

A mixture of 1 g. of the methiodide salt of Example 14, 0.5 g. of sodium methoxide and 10 ml. of dimethylformamide is heated at reflux for 10 minutes, then on the steam bath for 30 minutes. The cooled mixture is poured into water and extracted with ether to give 3β-hydroxy-11-keto-12,18-cyclo-20-allopregnene, disclosed and claimed in copending application, Serial No. 81,705 filed January 10, 1961.

What is claimed is:

1. A chemical compound selected from the group consisting of a base, its acid addition and its quaternary ammonium salts, the base having the structural formula:

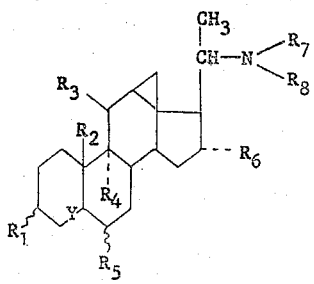

in which $R_1$ is a member selected from the group consisting of hydroxy and keto; $R_2$ and $R_6$ are members selected from the group consisting of hydrogen and methyl; $R_3$ is a member selected from the group consisting of hydrogen, hydroxy and keto; $R_4$ is a member selected from the group consisting of hydrogen and fluoro; $R_5$ is a member selected from the group consisting of hydrogen, methyl and fluoro; $R_7$ and $R_8$ are members selected from the group consisting of hydrogen and lower alkyl having from one to four carbon atoms, at least one of which is lower alkyl; and Y is a member selected from the group consisting of ethylene and vinylene.

2. $3\beta$ - hydroxy-20α-methylamino-12,18-cycloallopregnan-11-one.

3. 3α-hydroxy-20-methylamino-12,18-cyclopregnan-11-one.

4. $3\beta$ - hydroxy - 20α - methylamino - 12,18 - cycloallopregnane.

5. $3\beta,11\beta$ - dihydroxy - 20α - methylamino - 12,18-cycloallopregnane.

6. 3,11 - diketo - 20α - methylamino - 12,18 - cyclo - 4 - pregnene.

7. $3\beta$ - hydroxy - 20 - loweralkylamino - 19 - nor - 12,18-cycloallopregnan-11-one.

8. $3\beta$ - hydroxy - 20α - dimethylamino - 12,18 - cycloallopregnan-11-one.

9. The process of preparing a compound having the formula:

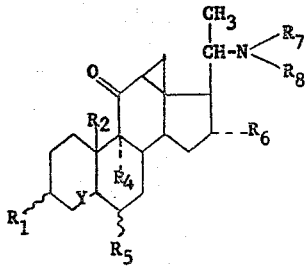

in which $R_1$ is a member selected from the group consisting of hydroxy and keto; $R_2$ and $R_6$ are members selected from the group consisting of hydrogen and methyl; $R_4$ is a member selected from the group consisting of hydrogen and fluoro; $R_5$ is a member of the group consisting of hydrogen, methyl and fluoro; $R_7$ and $R_8$ are members selected from the group consisting of hydrogen and lower alkyl having from one to four carbon atoms, at least one of which is lower alkyl; and Y is a member selected from the group consisting of ethylene and vinylene, comprising reacting in an alcoholic solution of a base selected from the group consisting of an alkali metal hydroxide, methoxide and ethoxide at temperatures from about room temperature up to the reflux temperature of the reaction mixture an 18-halo compound selected from the group consisting of a base and its acid addition salts, the base having the formula:

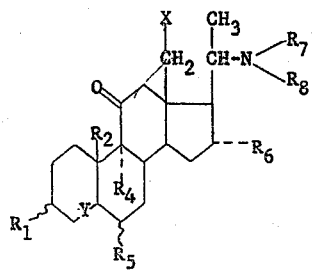

in which $R_1$ is a member selected from the group consisting of hydroxy, alkanoyloxy having a maximum of 6 carbon atoms, trifluoroacetoxy and keto; $R_2$ and $R_6$ are members selected from the group consisting of hydrogen and methyl; $R_4$ is a member selected from the group consisting of hydrogen and fluoro; $R_5$ is a member selected from the group consisting of hydrogen, fluoro and methyl; $R_7$ and $R_8$ are members selected from the group consisting of hydrogen and lower alkyl having from one to four carbon atoms, at least one of which is lower alkyl; Y is a member selected from the group consisting of ethylene and vinylene; and X is a member selected from the group consisting of chloro and bromo.

10. The process of claim 9 characterized in that the base is potassium hydroxide.

11. The process of claim 9 characterized in that the base is sodium hydroxide.

12. The process of claim 9 characterized in that the 18-halo compound is $3\beta$-trifluoroacetoxy-18-chloro-20α-methylaminoallopregnan-11-one trifluoroacetate salt.

No references cited.